(12) United States Patent
Nishiyama

(10) Patent No.: US 12,525,783 B2
(45) Date of Patent: Jan. 13, 2026

(54) DISCHARGE HANDLING SYSTEM

(71) Applicant: KANEKA CORPORATION, Osaka (JP)

(72) Inventor: Haruo Nishiyama, Osaka (JP)

(73) Assignee: KANEKA CORPORATION, Osaka (JP)

( * ) Notice: Subject to any disclaimer, the term of this patent is extended or adjusted under 35 U.S.C. 154(b) by 203 days.

(21) Appl. No.: 18/503,821

(22) Filed: Nov. 7, 2023

(65) Prior Publication Data

US 2024/0072529 A1 Feb. 29, 2024

Related U.S. Application Data

(63) Continuation of application No. PCT/JP2022/009480, filed on Mar. 4, 2022.

(30) Foreign Application Priority Data

May 11, 2021 (JP) ................................ 2021-080235

(51) Int. Cl.
| | |
|---|---|
| *H02H 1/00* | (2006.01) |
| *G01R 31/12* | (2020.01) |
| *H02H 7/12* | (2006.01) |

(52) U.S. Cl.
CPC ........... *H02H 1/0015* (2013.01); *G01R 31/12* (2013.01); *H02H 7/1203* (2013.01)

(58) Field of Classification Search
CPC ..... H02H 1/0015; H02H 7/1203; G01R 31/12
See application file for complete search history.

(56) References Cited

U.S. PATENT DOCUMENTS

| | | | | |
|---|---|---|---|---|
| 5,208,542 A | * | 5/1993 | Tennies | ................ H02H 1/0015 324/544 |
| 6,525,918 B1 | * | 2/2003 | Alles | .................... H02H 1/0015 361/87 |

(Continued)

FOREIGN PATENT DOCUMENTS

| | | |
|---|---|---|
| JP | 2014-134445 A | 7/2014 |
| JP | 2017-161417 A | 9/2017 |

(Continued)

OTHER PUBLICATIONS

International Preliminary Report on Patentability and Written Opinion issued in PCT/JP2022/009480; issued Nov. 14, 2023.

(Continued)

*Primary Examiner* — Scott Bauer
(74) *Attorney, Agent, or Firm* — Studebaker Brackett PLLC

(57) ABSTRACT

A discharge handling system includes: a power module; a power conversion device; and an arc discharge detection device, the arc discharge detection device including an arc discharge detector configured to detect occurrence of an arc discharge between the power module and the power conversion device, the arc discharge detection device monitoring the number of times of the arc discharge detected by the arc discharge detector and discharge time of the arc discharge every time a monitoring time elapses. The system includes a determination unit configured to determine necessity of maintenance within a predetermined period on condition that any of conditions (1) to (3) below is satisfied: (1) the number of times of the arc discharge in the monitoring time is from 1 to a number-of-times threshold inclusive; (2) each of the discharge time of the arc discharge in the monitoring time is equal to first determination time or less; and (3) total of the discharge time of the arc discharge in the (Continued)

monitoring time is equal to second determination time or less.

11 Claims, 6 Drawing Sheets

(56) References Cited

U.S. PATENT DOCUMENTS

| | | | |
|---|---|---|---|
| 7,190,562 B2 | 3/2007 | Pellon et al. | |
| 10,778,142 B2 | 9/2020 | Chaintreuil et al. | |
| 2006/0050447 A1 | 3/2006 | Pellon et al. | |
| 2007/0058304 A1* | 3/2007 | Parker | H02H 1/0015 |
| | | | 361/42 |
| 2009/0161270 A1* | 6/2009 | Beatty, Jr. | H02H 1/0015 |
| | | | 361/42 |
| 2014/0195177 A1* | 7/2014 | Kang | H02S 50/00 |
| | | | 702/58 |
| 2018/0062372 A1* | 3/2018 | Lee | G01R 31/1272 |
| 2019/0339319 A1* | 11/2019 | Jakupi | G01R 31/085 |

FOREIGN PATENT DOCUMENTS

| | | |
|---|---|---|
| KR | 10-2021-0025361 A | 3/2021 |
| WO | 2008/100318 A1 | 8/2008 |

OTHER PUBLICATIONS

International Search Report issued in PCT/JP2022/009480; mailed Apr. 19, 2022.
Supplementary Partial European Search Report issued by the European Patent Office on Apr. 25, 2025, which corresponds to European Patent Application No. 22807118.9 and is related to U.S. Appl. No. 18/503,821.

* cited by examiner

DISCHARGE HANDLING SYSTEM

TECHNICAL FIELD

The present invention relates to a discharge handling system that handles arc discharge.

BACKGROUND ART

In a conventional power generation facility such as a solar power generation facility or a fuel cell power generation facility, a fire may occur due to an arc discharge between a positive electrode cable and a negative electrode cable or at a contact portion. In the case of a solar power generation facility, direct-current power is generated by a solar cell module, and the generated direct-current power is supplied to a power conditioner side, which causes a problem that once an arc discharge occurs between the solar cell module and the power conditioner, the arc discharge is likely to continue. In addition, a power storage module that temporarily stores power generated by a solar cell module also supplies direct-current power to a power conditioner side when supplying the power to an external system, which causes a problem that once an arc discharge occurs between the power storage module and the power conditioner, the arc discharge is likely to continue.

Therefore, in a conventional solar power generation facility or the like, arc occurrence conditions are standardized in order to prevent a fire due to such an arc discharge. In a case where the arc occurrence conditions are satisfied, maintenance is immediately performed to prevent the occurrence of a fire or the like.

For example, as for an arc fault circuit breaker of US standard UL 1699B, when the amount of arc discharge energy is less than 750 J, it is required to perform disconnection within less than 2.5 seconds.

Note that Patent Document 1 is a document related to arc discharge.

Patent Document 1: JP 2014-134445 A

However, even when an arc discharge occurs in a solar power generation facility, the arc discharge may naturally end or stop when a portion where the arc discharge has occurred melts and disappears, or when the amount of power generation decreases according to sunshine conditions. Therefore, the occurrence of an arc discharge does not necessarily lead to a fire. For this reason, when maintenance is performed every time the occurrence of an arc discharge based on the conventional standard is detected, there is a problem that a maintenance provider needs to frequently perform unnecessary urgent maintenance, giving an excessive burden. In addition, there is a concern that an increase in the number of times of maintenance makes a user feel a sense of mental unease and a sense of financial distrust.

Therefore, an object of the present invention is to provide a discharge handling system capable of appropriately handling the occurrence of an arc discharge according to a situation.

SUMMARY

In order to solve the above problems, the present inventors have studied a correlation between the occurrence of an arc discharge and the occurrence of a fire due to the arc discharge, and have found that a fire occurrence risk due to the arc discharge tends to be high in a case where the arc discharge has a long discharge time or the arc discharge occurs intermittently a plurality of times.

That is, it has been found that in a case where the number of times of the arc discharge within a certain period is a few or a total discharge time of the arc discharge is short, the fire occurrence risk tends to be low because the arc discharge does not continuously occur, and in a case where one arc discharge has a short discharge time, the fire occurrence risk tends to be low because the arc discharge ends or stops instantaneously.

Therefore, one aspect of the present invention derived as a result of study by the present inventors based on the above findings is a discharge handling system including: a power module; a power conversion device; and an arc discharge detection device, the arc discharge detection device including an arc discharge detector configured to detect occurrence of an arc discharge between the power module and the power conversion device, —the arc discharge detection device monitoring the number of times of the arc discharge detected by the arc discharge detector and discharge time of the arc discharge every time a monitoring time elapses, the discharge handling system including a determination unit configured to determine necessity of maintenance within a predetermined period on condition that any of conditions (1) to (3) below is satisfied: (1) the number of times of the arc discharge in the monitoring time is from 1 to a number-of-times threshold inclusive; (2) each of the discharge time of the arc discharge in the monitoring time is equal to first determination time or less; and (3) total of the discharge time of the arc discharge in the monitoring time is equal to second determination time or less.

The term "power module" as used herein refers to a module related to generation, storage, and supply of power. The "power module" includes, for example, not only a power generation module such as a solar cell module including a solar cell or a fuel cell module including a fuel cell, but also a power storage module including a secondary cell.

According to this aspect, it is possible to appropriately determine the necessity of maintenance according to a fire occurrence risk, so that it is possible to appropriately handle the occurrence of an arc discharge according to a situation. Therefore, it is possible to make a maintenance provider less frequently perform unnecessary maintenance in an emergency, and to reduce the number of times of unnecessary maintenance. As a result, it is possible to prevent the maintenance provider from being given an excessive burden, and a user from feeling a sense of mental unease and a sense of financial distrust.

In a preferred aspect, the power module is a solar cell module, a fuel cell module, or a power storage module.

In a preferred aspect, the determination unit determines necessity of maintenance within the predetermined period on condition that all the conditions (1) to (3) are satisfied.

According to this aspect, the necessity of maintenance can be determined on the basis of a condition having a lower fire occurrence risk, so that it is possible to reduce the number of times of unnecessary maintenance while mitigating the fire occurrence risk more accurately.

In a preferred aspect, the determination unit determines necessity of maintenance within a period shorter than the predetermined period on condition that the number of times of the arc discharge in the monitoring time exceeds the number-of-times threshold.

In a preferred aspect, the determination unit determines necessity of maintenance within a period shorter than the predetermined period on condition that discharge time in the monitoring time exceeds the first determination time.

In a preferred aspect, the determination unit determines necessity of maintenance within a period shorter than the predetermined period on condition that total discharge time of the arc discharge in the monitoring time exceeds the second determination time.

According to the above aspect, maintenance can be promptly performed in the case of a high fire occurrence risk, so that it is possible to reduce the occurrence of a fire due to the arc discharge.

A preferred aspect includes a plurality of power generation facilities each including the power module, the power conversion device, and the arc discharge detection device, wherein each of the power generation facilities is connected to a management server via a network, and wherein the determination unit is provided in the management server.

According to this aspect, the plurality of power generation facilities are connected to the management server, and the determination unit is provided on the management server side. Therefore, it is not necessary to provide the determination unit in each power generation facility, and manufacturing costs of each power generation facility can be reduced.

In a preferred aspect, the arc discharge detection device is connected to a management server via a network, the arc discharge detection device including a communication state check unit configured to transmit data to or receive data from the management server, the arc discharge detection device executes a communication check operation on condition that the arc discharge detector detects the arc discharge, and in the communication check operation, the communication state check unit transmits data to or receives data from the management server every time check time elapses.

According to this aspect, the communication check operation is executed from a time point when the arc discharge is detected for the first time, so that it is possible to check whether a communication state is currently maintained while reducing a load on the management server. Therefore, it is possible to promptly perform maintenance in an emergency.

In a preferred aspect, the arc discharge detection device includes an arc discharge notification unit configured to notify occurrence of the arc discharge, and the arc discharge notification unit does not directly notify the occurrence of the arc discharge in a case where all the conditions (1) to (3) are satisfied.

To "not directly notify the occurrence of the arc discharge" as described herein means not directly making a notification that suggests the occurrence of the arc discharge such as "arc discharge is occurring".

According to this aspect, a user is not directly notified of the occurrence of the arc discharge in the case of a low fire occurrence risk, so that it is possible to prevent the user from feeling a sense of mental unease by being notified of the occurrence of the arc discharge.

A preferred aspect includes a worker terminal including a work-side notification unit configured to notify maintenance within the predetermined period in a case where the determination unit determines that maintenance within the predetermined period is necessary.

According to this aspect, a maintenance provider is forced to carry the worker terminal, so that the work-side notification unit notifies the maintenance within the predetermined period in a case where the determination unit determines that the maintenance within the predetermined period is necessary. This facilitates adjustment of a maintenance date and time.

One aspect of the present invention is a discharge handling system including: a power module; a power conversion device; and an arc discharge detection device, the arc discharge detection device including: an arc discharge detector configured to detect occurrence of an arc discharge between the power module and the power conversion device; an arc discharge interrupter configured to interrupt the arc discharge between the power module and the power conversion device; and a power conversion controller configured to forcibly stop the power conversion device, the arc discharge detection device monitoring the number of times of the arc discharge detected by the arc discharge detector and discharge time of the arc discharge every time a monitoring time elapses, the arc discharge interrupter interrupting the arc discharge on condition that any of conditions (4) to (6) below is satisfied, and necessity of maintenance within a predetermined period being determined on condition that all of conditions (7) to (9) below are satisfied: (4) the number of times of the arc discharge in the monitoring time exceeds a number-of-times threshold; (5) each of the discharge time of the arc discharge in the monitoring time exceeds first determination time; (6) total of the discharge time of the arc discharge in the monitoring time exceeds second determination time; (7) the number of times of the arc discharge in the monitoring time is equal to 1 or more; (8) the arc discharge between the power module and the power conversion device is not interrupted by the arc discharge interrupter; and (9) the power conversion device is not forcibly stopped by the power conversion controller.

According to this aspect, it is possible to appropriately determine the necessity of maintenance according to a fire occurrence risk, so that it is possible to appropriately handle the occurrence of an arc discharge according to a situation. Therefore, it is possible to make a maintenance provider less frequently perform unnecessary maintenance in an emergency, and to reduce the number of times of unnecessary maintenance. As a result, it is possible to prevent the maintenance provider from being given an excessive burden, and a user from feeling a sense of mental unease and a sense of financial distrust.

With the discharge handling system of the present invention, it is possible to appropriately handle the occurrence of an arc discharge according to a situation.

DETAILED DESCRIPTION OF EMBODIMENTS

Hereinafter, embodiments of the present invention will be described in detail.

Figure 1:
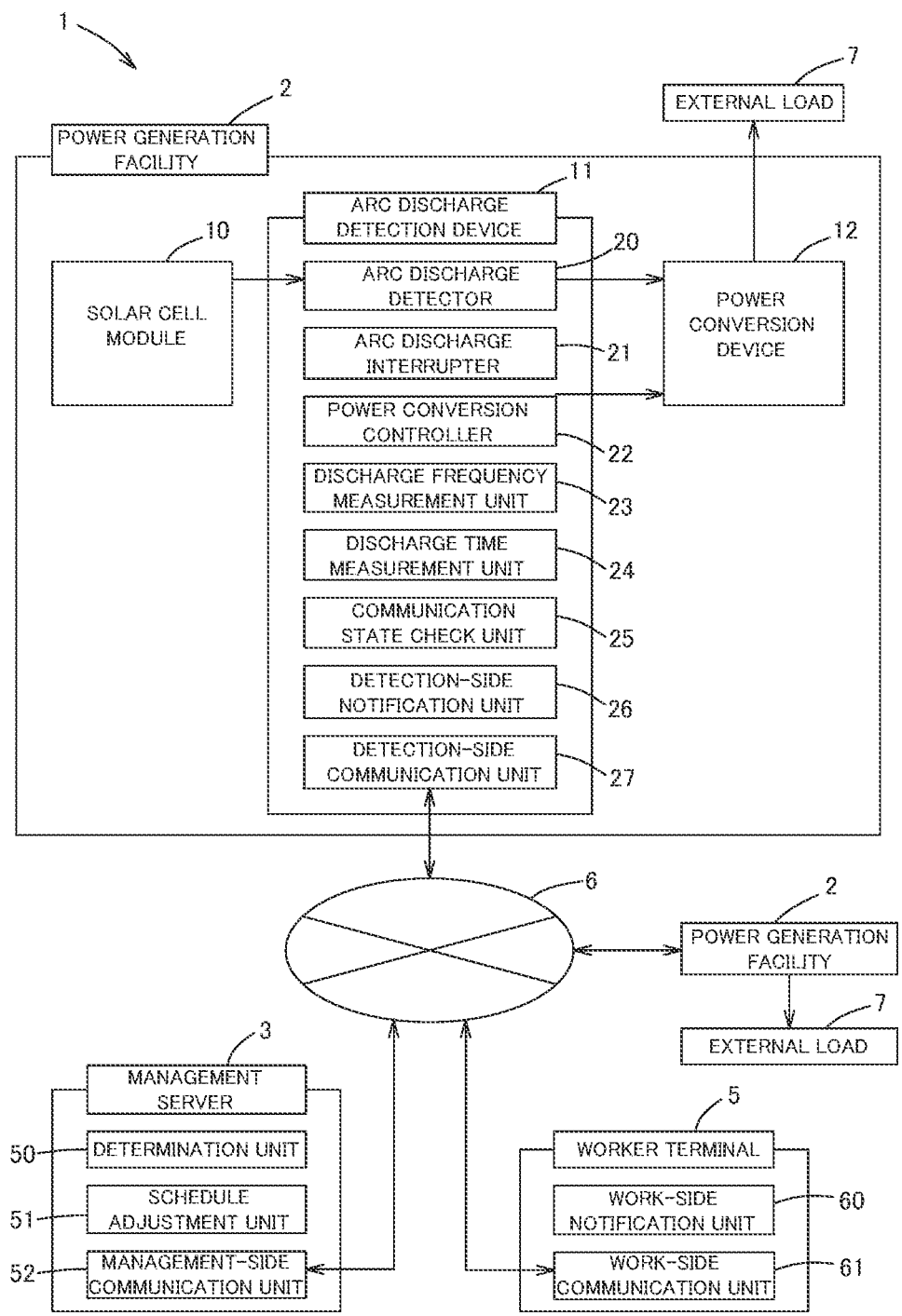
FIG. 1 is a block diagram of a discharge handling system according to a first embodiment of the present invention.

As illustrated in FIG. 1, a discharge handling system 1 according to a first embodiment of the present invention includes one or a plurality of power generation facilities 2, a management server 3, and a worker terminal 5, and each power generation facility 2, the management server 3, and the worker terminal 5 are connected to each other via a network 6 such as the Internet or an intranet.

As illustrated in FIG. 1, the power generation facility 2 includes a solar cell module 10 (power module), an arc discharge detection device 11, and a power conversion device 12.

The power generation facility 2 is a power supply apparatus in which an external load 7 is connected to the power conversion device 12, and power generated by the solar cell module 10 is supplied with the external load 7 from the power conversion device 12.

The solar cell module 10 is a photoelectric conversion device that converts light energy into electric energy, and is a power generation module that generates direct-current power.

The solar cell module 10 includes a plurality of solar cell strings in which one or a plurality of solar cell panels are electrically connected in series, and each solar cell string is connected in parallel with the power conversion device 12.

The arc discharge detection device 11 is an arc monitoring device that monitors occurrence of an arc discharge, and includes a computer including, as a hardware configuration, a central processing unit composed of a control unit that controls each unit and an arithmetic unit that performs arithmetic operations on data, a storage unit that stores data, an input unit that inputs data from the outside, and an output unit that outputs data to the outside.

As illustrated in FIG. 1, the arc discharge detection device 11 includes, as main parts, an arc discharge detector 20, an arc discharge interrupter 21, a power conversion controller 22, a discharge frequency measurement unit 23, a discharge time measurement unit 24, a communication state check unit 25, a detection-side notification unit 26 (arc discharge notification unit), and a detection-side communication unit 27.

The arc discharge detector 20 is a unit that detects an arc discharge in an electric circuit from the solar cell module 10 to the external load 7.

The arc discharge detector 20 of the present embodiment is provided between the solar cell module 10 and the power conversion device 12, and can detect an arc discharge occurring between the solar cell module 10 and the power conversion device 12.

The arc discharge interrupter 21 is a unit that interrupts an arc discharge between the solar cell module 10 and the power conversion device 12 in a case where the arc discharge occurs between the solar cell module 10 and the power conversion device 12.

The arc discharge interrupter 21 includes a series arc discharge interrupter that interrupts a series arc discharge, and a parallel arc discharge interrupter that interrupts a parallel arc discharge.

The power conversion controller 22 is a unit that controls the power conversion device 12, and can forcibly stop the power conversion device 12.

The discharge frequency measurement unit 23 is a unit that measures how many times an arc discharge is detected by the arc discharge detector 20.

The discharge time measurement unit 24 is a unit that measures how long an occurred arc discharge detected by the arc discharge detector 20 is continued.
an occurrence time of an arc discharge detected by the arc discharge detector 20.

The communication state check unit 25 is a unit that checks whether a communication state between the power generation facility 2 and the management server 3 functions normally by transmitting data to the management server 3 or receiving data from the management server 3.

The detection-side notification unit 26 is a unit that notifies a user of the occurrence of an arc discharge in the power generation facility 2.

A method of notification to the user by the detection-side notification unit 26 is not particularly limited, and may be a notification method using a visual sensation by images, videos, or the like, a notification method using an auditory sensation by sound or the like, or a notification method using a tactile sensation by vibration or the like.

The detection-side communication unit 27 is a unit capable of intercommunication of data with the network 6 in a wireless or wired manner.

The power conversion device 12 is a device that converts power between direct-current power and alternating-current power, and, in the present embodiment, is a power conditioner that converts direct-current power into alternating-current power.

The management server 3 is a server that manages an operation status of each power generation facility 2.

The management server 3 is a computer including, as a hardware configuration, a central processing unit composed of a control unit that controls each unit and an arithmetic unit that performs arithmetic operations on data, a storage unit that stores data, an input unit that inputs data from the outside, and an output unit that outputs data to the outside.

As illustrated in FIG. 1, the management server 3 mainly includes a determination unit 50, a schedule adjustment unit 51, and a management-side communication unit 52.

The determination unit 50 is a unit that determines necessity of maintenance and a timing of maintenance according to a fire occurrence risk caused by an arc discharge occurred in each power generation facility 2.

The schedule adjustment unit 51 is a unit that adjusts a schedule of a maintenance worker who performs a maintenance work based on a determination result of the determination unit 50.

The management-side communication unit 52 is a unit capable of intercommunication of data with the network 6 in a wireless or wired manner.

The worker terminal 5 is a portable terminal or a fixed terminal owned by the maintenance worker.

The worker terminal 5 is a computer including, as a hardware configuration, a central processing unit composed of a control unit that controls each unit and an arithmetic unit that performs arithmetic operations on data, a storage unit that stores data, an input unit that inputs data from the outside, and an output unit that outputs data to the outside.

As illustrated in FIG. 1, the worker terminal 5 mainly includes a work-side notification unit 60 and a work-side communication unit 61.

The work-side notification unit 60 is a unit that notifies the maintenance worker of a timing of performing maintenance.

A method of notification to the maintenance worker by the work-side notification unit 60 is not particularly limited, and may be a notification method using a visual sensation by images, videos, or the like, a notification method using an auditory sensation by sound or the like, or a notification method using a tactile sensation by vibration or the like.

The work-side communication unit 61 is a unit capable of intercommunication of data with the network 6 in a wireless or wired manner.

Next, a discharge handling operation in the discharge handling system 1 of the present invention will be described with reference to flowcharts of FIGS. 2 to 5.

The discharge handling operation of the present embodiment performs a discharge detection operation executed by the power generation facility 2 and a maintenance determination operation executed by the management server 3.

(Discharge Detection Operation)

The discharge detection operation is repeatedly performed while the power generation facility 2 is running.

Figure 2:
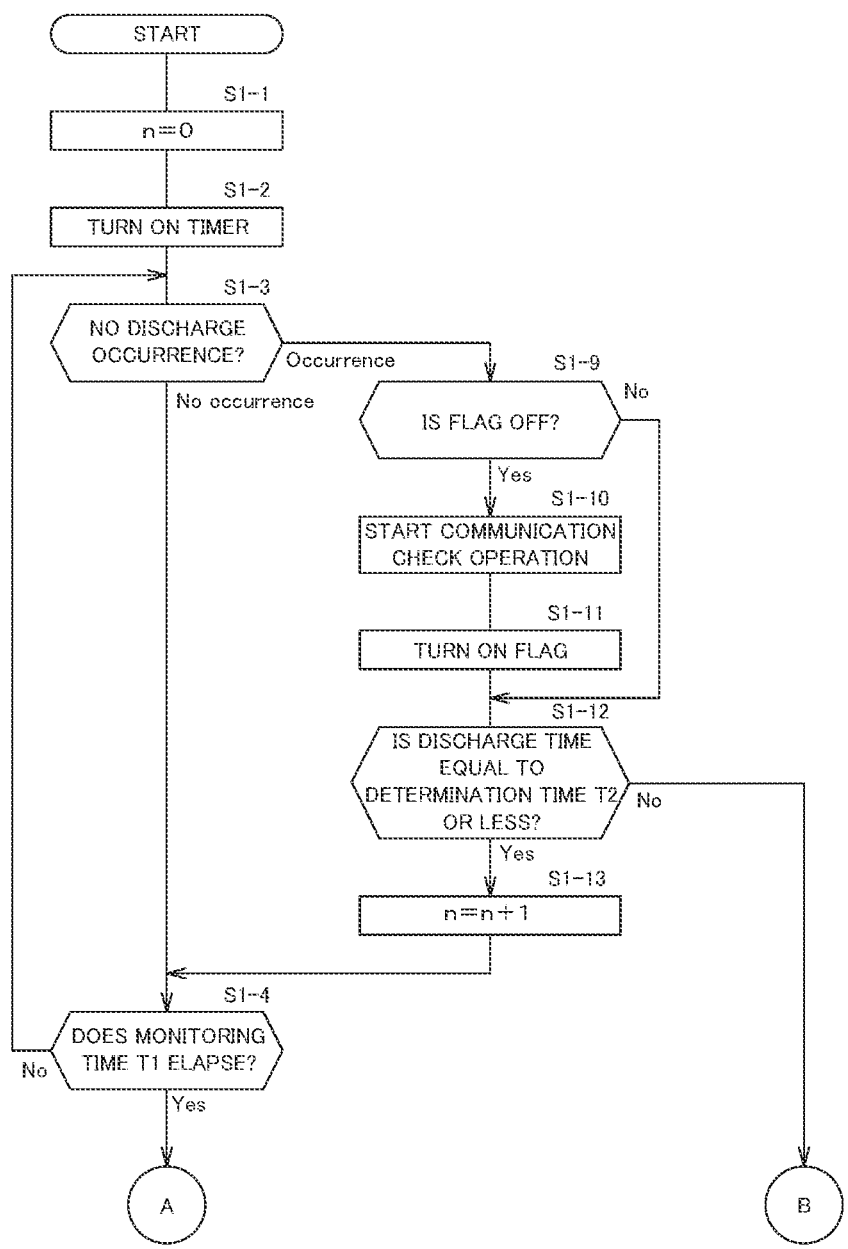
FIG. 2 is a flowchart of a discharge detection operation of the discharge handling system in FIG. 1.

In the discharge detection operation, first, a counter n (hereinafter also referred to as the number of times n) is reset (n=0) (step S1-1), and a timer is turned on (step S1-2) as illustrated in FIG. 2. Then, the arc discharge detector 20 checks whether or not an arc discharge occurs between the solar cell module 10 and the power conversion device 12 (step S1-3).

In a case where no arc discharge occurs in step S1-3 (No occurrence in step S1-3), it is checked whether a monitoring time T1 has elapsed since the timer was turned on in step S1-2 (step S1-4).

The monitoring time T1 can be appropriately changed in consideration of a situation of the power generation facility 2 or the like, but is preferably from 3 minutes to 20 minutes inclusive, and more preferably from 5 minutes to 15 minutes inclusive, from the viewpoint of mitigating the fire occurrence risk due to an arc discharge.

Figure 3:
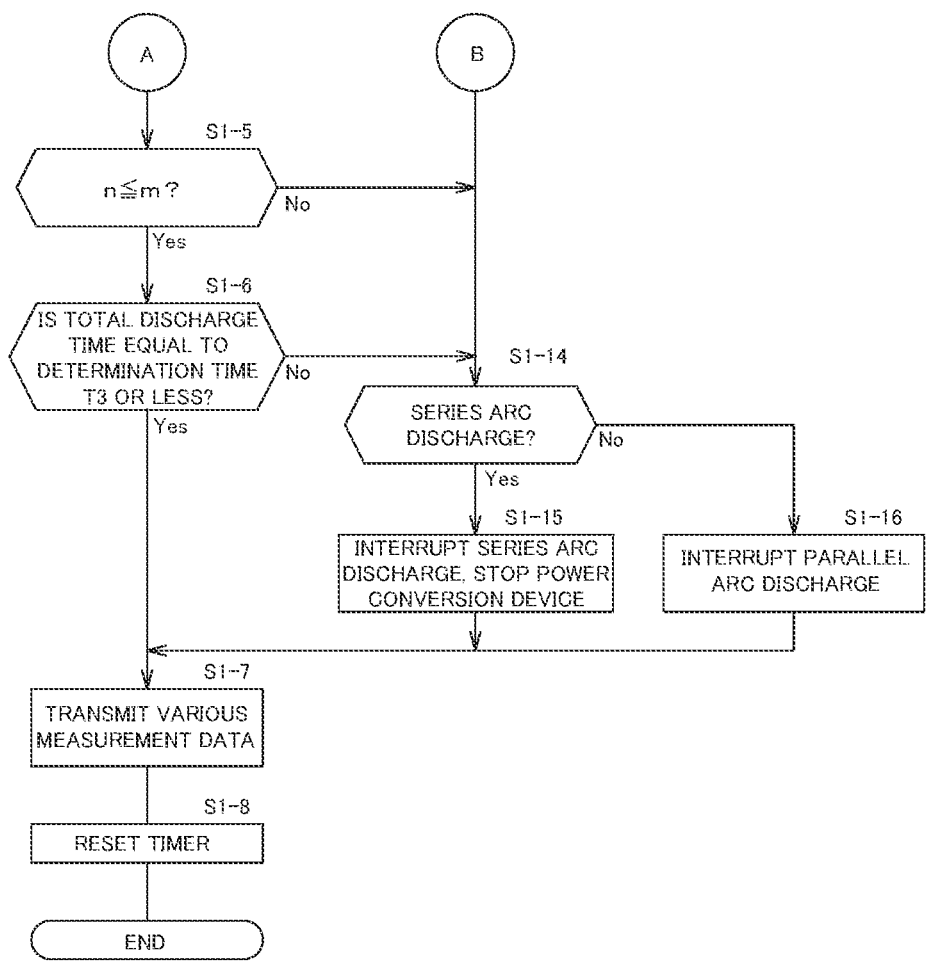
FIG. 3 is a flowchart of the discharge detection operation of the discharge handling system following FIG. 2.

In a case where the monitoring time T1 has elapsed since the timer was turned on (Yes in step S1-4), the process proceeds to step S1-5 of FIG. 3, and it is checked whether the counter n is a number-of-times threshold m or less (step S1-5). That is, it is checked whether the number of times n showing how many times arc discharge occurred is equal to the number-of-times threshold m or less.

The number-of-times threshold m at this time can be appropriately changed in consideration of the situation of the power generation facility 2, but the length of the monitoring time T1 or the like is preferably from 2 times to 10 times inclusive, and more preferably from 3 times to 5 times inclusive, from the viewpoint of mitigating the fire occurrence risk due to an arc discharge.

In a case where the counter n is equal to the number-of-times threshold m or less (Yes in step S1-5), it is checked whether a total discharge time of the arc discharge is equal to a determination time T3 (second determination time) or less (step S1-6).

The determination time T3 at this time can be appropriately changed in consideration of the situation of the power generation facility 2, the length of the monitoring time T1, or the like, but is a time equal to or less than the monitoring time T1, and preferably a time from ⅕ to ½ inclusive of the monitoring time T1, from the viewpoint of mitigating the fire occurrence risk due to an arc discharge. The determination time T3 can be set to, for example, 5 seconds to 20 seconds inclusive.

In a case where the total discharge time is equal to the determination time T3 or less in step S1-6 (Yes in step S1-6), the arc discharge detection device 11 transmits various measurement data to the management server 3 (step S1-7), and the timer is reset (step S1-8).

The various measurement data transmitted to the management server 3 at this time includes the number about how many times the arc discharge occurs in the monitoring time T1, how long the arc discharge time is continued at each time, how long the discharge time of the arc discharge is continued totally, the presence or absence of interruption against the arc discharge by the arc discharge interrupter 21, and the presence or absence of a forced stop of the power conversion device 12 by the power conversion controller 22.

In the discharge detection operation, in a case where the arc discharge occurs in step S1-3 of FIG. 2 (Occurrence in step S1-3), it is checked whether a flag is off (step S1-9).

In a case where the flag is off in step S1-9 (Yes in step S1-9), a communication check operation is executed (step S1-10).

The communication check operation is an operation of checking a communication state with the management server 3, and is an operation executed in parallel with the flow of the discharge detection operation.

Figure 4:
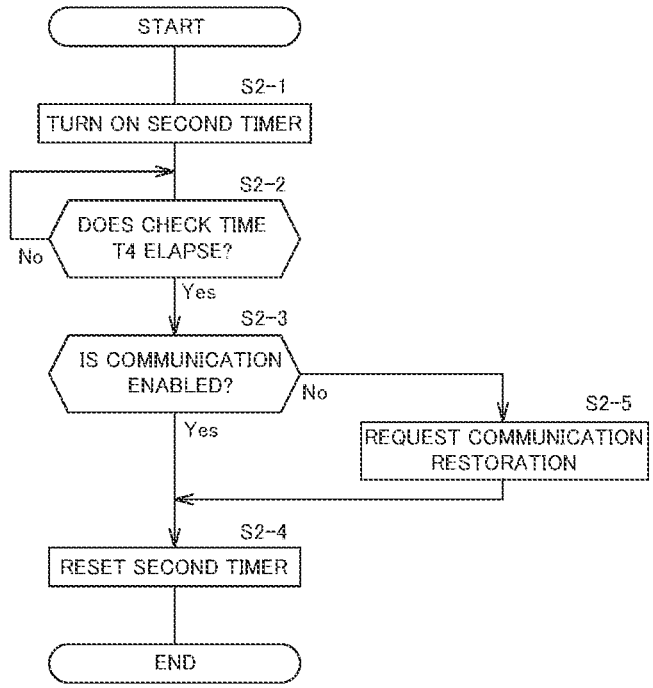
FIG. 4 is a flowchart of a communication check operation in FIG. 2.

Specifically, in the communication check operation, first, a second timer is turned on (step S2-1), and it is checked whether a check time T4 has elapsed since the turning on of the second timer (step S2-2) as illustrated in FIG. 4.

The check time T4 at this time is a time longer than the monitoring time T1, and can be set to, for example, 12 hours to 2 days inclusive.

In a case where the check time T4 has elapsed since the turning on of the second timer in step S2-2 (Yes in step S2-2), it is checked whether communication is enabled by receiving data from the management server 3 or transmitting data to the management server 3 (step S2-3).

In a case where communication with the management server 3 is enabled in step S2-3 (Yes in step S2-3), the second timer is reset (step S2-4).

On the other hand, in a case where communication with the management server 3 is disabled in step S2-3 (No in step S2-3), a management worker who manages the management server 3 is requested to restore communication (step S2-5), and the second timer is reset (step S2-4).

The above is the communication check operation, and is repeatedly executed independently of the discharge detection operation.

Returning to the flowchart of FIG. 2, when the communication check operation is started in step S1-10, the flag is turned on (step S1-11), and it is checked whether a discharge time of the arc discharge is equal to a determination time T2 (first determination time) or less (step S1-12).

The determination time T2 at this time can be appropriately changed in consideration of the situation of the power generation facility 2, the length of the monitoring time T1, the length of the determination time T3, or the like, but is a time equal to or less than the determination time T3, and preferably a time from ⅕ to ½ inclusive of the determination time T3, from the viewpoint of mitigating the fire occurrence risk due to an arc discharge. The determination time T2 can be set to, for example, from 1 second to 10 seconds inclusive.

In a case where the discharge time of the arc discharge is equal to the determination time T2 or less in step S1-12 (Yes in step S1-12), the counter n is set to n+1 (step S1-13), and the process proceeds to step S1-4.

On the other hand, in a case where the discharge time of the arc discharge exceeds the determination time T2 (first determination time) in step S1-12 (No in step S1-12), the process proceeds to step S1-14 of FIG. 3, and it is checked whether the arc discharge is a series arc discharge.

In a case where the arc discharge is a series arc discharge in step S1-14 (Yes in step S1-14), the series arc discharge interrupter of the arc discharge interrupter 21 interrupts the series arc discharge, and the power conversion controller 22 forcibly stops the power conversion device 12 (step S1-15). The process then proceeds to step S1-7.

At this time, it is preferable that the detection-side notification unit 26 notifies a user of the detection of the series arc discharge and the interruption of the series arc discharge as well as the forced stop of the power conversion device 12.

On the other hand, in a case where a parallel arc discharge occurs instead of the series arc discharge in step S1-14 (No in step S1-14), the parallel arc discharge interrupter of the arc discharge interrupter 21 interrupts the parallel arc discharge (step S1-16), and the process proceeds to step S1-7.

At this time, the detection-side notification unit 26 notifies the user of the detection of the parallel arc discharge and the interruption of the parallel arc discharge.

In a case where the monitoring time T1 has not elapsed since the turning on of the timer in step S1-4 of FIG. 2 (No in step S1-4), the process proceeds to step S1-3.

In a case where the counter n exceeds the number-of-times threshold m in step S1-5 of FIG. 3 (No in step S1-5), and in a case where the total discharge time exceeds the determination time T3 (second determination time) in step S1-6 (No in step S1-6), the process proceeds to step S1-14.

In a case where the flag is on in step S1-9 of FIG. 2 (No in step S1-9), the process proceeds to step S1-12.

(Maintenance Determination Operation)

Subsequently, the management server 3 that has received the various measurement data in step S1-7 of the discharge detection operation executes the maintenance determination operation.

Figure 5:
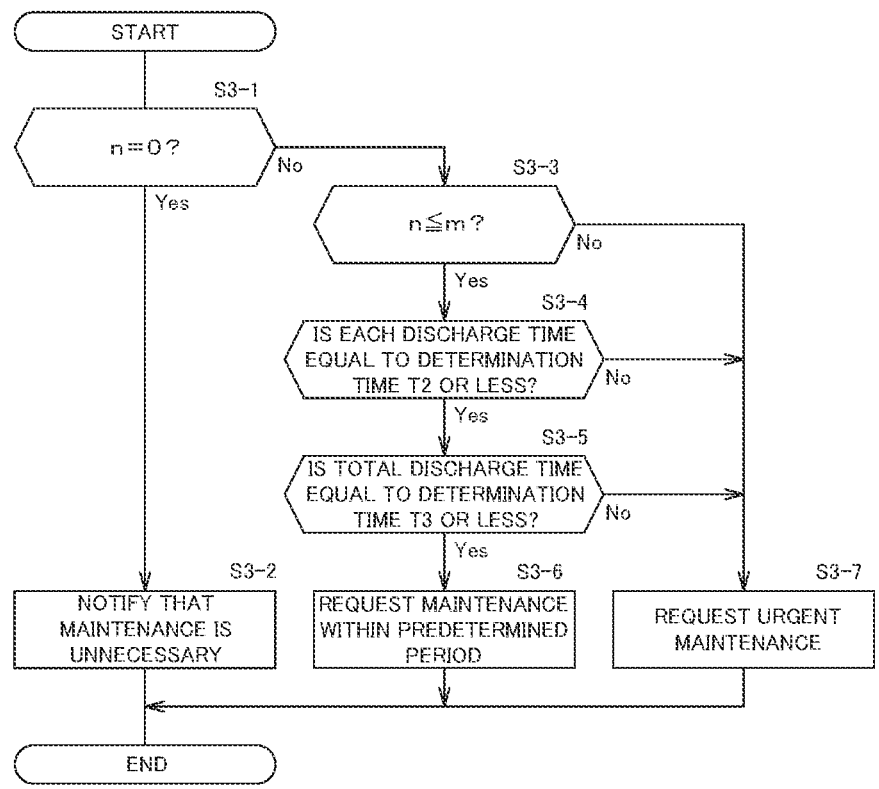
FIG. 5 is a flowchart of a maintenance determination operation of the discharge handling system in FIG. 1.

That is, in the maintenance determination operation, first, it is checked whether the counter n is 0 on the basis of the various measurement data (step S3-1) as illustrated in FIG. 5.

In a case where the counter n is 0 in step S3-1 (Yes in step S3-1), no arc discharge occurs between the solar cell module 10 and the power conversion device 12. Thus, the determination unit 50 determines that maintenance is unnecessary at this point in time, and notifies a maintenance worker that maintenance is unnecessary at this point in time through the worker terminal 5 (step S3-2).

On the other hand, in a case where the counter n is not 0 in step S3-1 (No in step S3-1), it is checked whether the counter n is the number-of-times threshold m or less (step S3-3).

In a case where the counter n is equal to the number-of-times threshold m or less in step S3-3 (Yes in step S3-3), it is checked whether each discharge time of the arc discharge is the determination time T2 or less (step S3-4).

In a case where each discharge time of the arc discharge is equal to the determination time T2 or less in step S3-4 (Yes in step S3-4), it is checked whether the total discharge time of the arc discharge is the determination time T3 or less (step S3-5).

In a case where the total discharge time of the arc discharge is the determination time T3 or less in step S3-5 (Yes in step S3-5), the determination unit 50 determines that the fire occurrence risk is low and early maintenance is unnecessary, the schedule adjustment unit 51 adjusts a maintenance date and time within a predetermined period, and the management server 3 requests the maintenance worker to perform maintenance within the predetermined period by notification to the maintenance worker through the worker terminal 5 (step S3-6).

At this time, the schedule adjustment unit 51 sets the maintenance date and time within the predetermined period in accordance with a schedule of the maintenance worker.

The predetermined period at this time can be appropriately set according to a situation of the arc discharge, but is preferably a period of one week to one month inclusive.

In addition, the predetermined period may be a period similar to a normal maintenance period, or may be a period shorter than the normal maintenance period.

In a case where the counter n exceeds the number-of-times threshold m in step S3-3, when each discharge time of the arc discharge exceeds the determination time T2 in step S3-4, or when the total discharge time of the arc discharge exceeds the determination time T3 in step S3-5, the determination unit 50 determines that the fire occurrence risk is high and urgent maintenance is necessary, and the management server 3 notifies the maintenance worker that urgent maintenance is necessary through the worker terminal 5, and requests the maintenance worker to perform urgent maintenance (step S3-7).

That is, the maintenance is requested in a time shorter than the predetermined period in step S3-6.

As for the discharge handling system 1 of the present embodiment, the arc discharge detection device 11 monitors the number of times n of the arc discharge detected by the arc discharge detector 20 and the discharge time of the arc discharge every time the monitoring time T1 elapses. The determination unit 50 determines maintenance within the predetermined period on condition that in the maintenance determination operation, the number of times n of the arc discharge in the monitoring time T1 is from 1 to the number-of-times threshold m inclusive, each discharge time of the arc discharge in the monitoring time T1 is equal to the determination time T2 or less, and the total discharge time of the arc discharge in the monitoring time T1 is equal to the determination time T3 or less. Therefore, it is possible to appropriately determine the necessity of maintenance according to the fire occurrence risk, and to appropriately handle the occurrence of the arc discharge according to the situation. That is, it is possible to make a maintenance provider less frequently perform unnecessary maintenance for an emergency, and to reduce the number of times of unnecessary maintenance. As a result, it is possible to prevent the maintenance provider from being given an excessive burden, and a user from feeling a sense of mental unease as well as a sense of financial distrust.

As for the discharge handling system 1 of the present embodiment, the detection-side notification unit 26 of the arc discharge detection device 11 does not directly notify the user of the occurrence of the arc discharge in a case where the number of times of the arc discharge in the monitoring time T1 is from 1 to the number-of-times threshold m inclusive, each discharge time of the arc discharge is equal to the determination time T2 or less, and the total discharge time of the arc discharge in the monitoring time T1 is equal to the determination time T3 or less. That is, in a case where the fire occurrence risk is low, the detection-side notification unit 26 does not directly notify the user of the occurrence of the arc discharge. This makes it possible to prevent the user from feeling a sense of mental unease due to the occurrence of the arc discharge.

Meanwhile, in a case where the management server 3 manages the presence or absence of the occurrence of the arc discharge in the plurality of power generation facilities 2 through periodic communication, the plurality of power generation facilities 2 periodically perform a plurality of accesses to the management server 3. Therefore, depending on the number of power generation facilities 2 and the capacity of the management server 3, a communication path between the power generation facility 2 and the network 6, a communication path between the management server 3 and the network 6, and the like may overflow, and information may be delayed in an emergency.

In this regard, it is considered that communication traffic between the power generation facility 2 and the management server 3 can be greatly reduced by setting, as a start timing of periodic communication, a time point at which the arc discharge is detected by the arc discharge detector 20 for the first time. However, on the other hand, there is a problem that it is difficult to determine whether communication between the power generation facility 2 and the management server 3 is maintained in an enabled state.

Therefore, as for the discharge handling system 1 of the present embodiment, the communication check operation is executed from the time point at which the arc discharge is detected for the first time, and in the communication check operation, it is checked whether communication is enabled by transmitting data or receiving data every time the check time T4 longer than the monitoring time T1 elapses. Therefore, it is possible to check whether a communication state is maintained regardless of the discharge detection operation with a load on the management server 3 being reduced. Thus, it is possible to take a quick response even in an emergency.

In addition, by using the discharge handling system 1 of the present embodiment, in a case where communication is disabled in the communication check operation, a management worker who manages the management server 3 is requested to restore communication. Therefore, a communication state can be promptly restored.

Next, a discharge handling system according to a second embodiment of the present invention will be described.

The discharge handling system of the second embodiment is different from the discharge handling system of the first embodiment in the maintenance determination operation.

Figure 6:
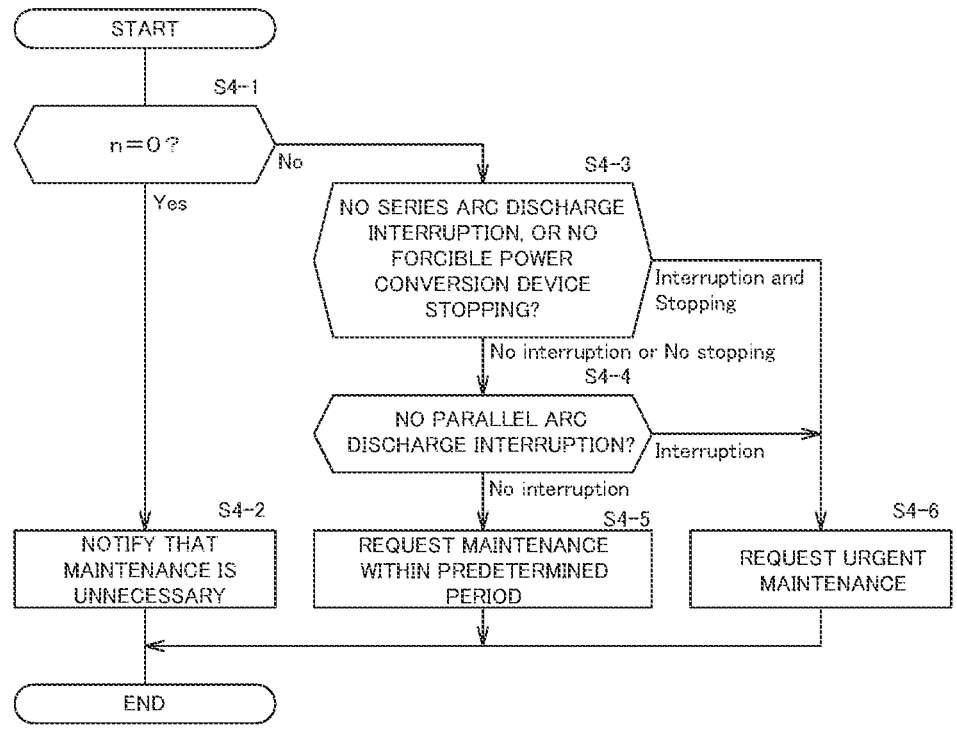
FIG. 6 is a flowchart of a maintenance determination operation of a discharge handling system according to a second embodiment of the present invention.

In the maintenance determination operation of the second embodiment, first, it is checked whether the counter n is 0, referring to the various measurement data (step S4-1) as illustrated in FIG. 6.

In a case where the counter n is 0 in step S4-1 (Yes in step S4-1), no arc discharge occurs between the solar cell module 10 and the power conversion device 12. Thus, the determination unit 50 determines that maintenance is unnecessary at this point in time, and the management server 3 notifies a maintenance worker that maintenance is unnecessary at this point in time by the worker terminal 5 (step S4-2).

On the other hand, in a case where the counter n is not 0 in step S4-1 (No in step S4-1), it is checked whether or not the series arc discharge is interrupted by the series arc discharge interrupter of the arc discharge interrupter 21 or whether or not the power conversion device 12 is forcibly stopped by the power conversion controller 22 (step S4-3).

In a case where the series arc discharge is not interrupted by the series arc discharge interrupter of the arc discharge interrupter 21 or the power conversion device 12 is not forcibly stopped by the power conversion controller 22 in step S4-3 (No interruption or No stopping in step S4-3), it is checked whether or not the parallel arc discharge is interrupted by the parallel arc discharge interrupter of the arc discharge interrupter 21 (step S4-4).

In a case where the parallel arc discharge is not interrupted by the parallel arc discharge interrupter of the arc discharge interrupter 21 in step S4-4 (No interruption in step S4-4), the determination unit 50 determines that the fire occurrence risk is low and early maintenance is unnecessary, and the schedule adjustment unit 51 adjusts a maintenance date and time within a predetermined period. Then, the management server 3 requests the maintenance worker to perform maintenance within the predetermined period by notification to the maintenance worker by the worker terminal 5 (step S4-5).

In a case where the series arc discharge is interrupted by the series arc discharge interrupter of the arc discharge interrupter 21, and the power conversion device 12 is forcibly stopped by the power conversion controller 22 in step S4-3 (Interruption and Stopping in step S4-3), and in a case where the parallel arc discharge is interrupted by the parallel arc discharge interrupter of the arc discharge interrupter 21 (Interruption in step S4-4), the determination unit 50 determines that the fire occurrence risk is high and urgent maintenance is necessary, and the management server 3 notifies the maintenance worker that urgent maintenance is necessary through the worker terminal 5, and requests the maintenance worker to perform urgent maintenance (step S4-6).

Next, a discharge handling system according to a third embodiment of the present invention will be described.

The discharge handling system of the third embodiment is different from the discharge handling system of the first embodiment in the communication check operation and the discharge detection operation.

(Communication Check Operation)

The communication check operation of the third embodiment is an operation that is individually executed independently of the discharge detection operation, and is a periodic communication check operation that is periodically executed regardless of the presence or absence of the occurrence of an arc discharge in the power generation facility 2.

Figure 7:
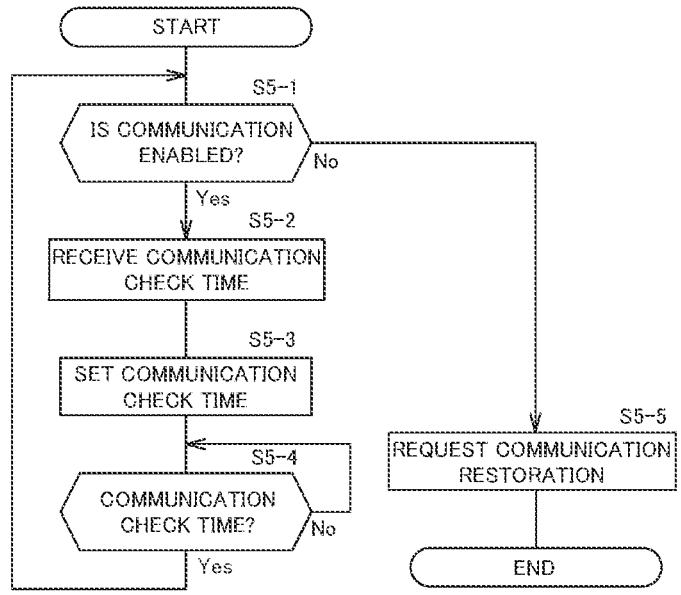
FIG. 7 is a flowchart of a communication check operation of a discharge handling system according to a third embodiment of the present invention.

In the communication check operation of the third embodiment, first, at the time of installation of the power generation facility 2, it is checked whether communication with the management server 3 is enabled by receiving data from the management server 3 or transmitting data to the management server 3 (step S5-1) as illustrated in FIG. 7.

In a case where communication with the management server 3 is enabled in step S5-1 (Yes in step S5-1), a communication check time for checking whether communication is enabled next time is received from the management server 3 (step S5-2), and the communication check time is set (step S5-3).

At this time, the communication check time is individually determined for each power generation facility 2 such that the communication does not overlap with communication between the management server 3 and other power generation facilities 2. That is, the management server 3 sets the communication check times dispersively allocated to the respective power generation facilities 2 so as to prevent communication traffic from increasing by communication with the plurality of power generation facilities 2.

When the communication check time is set in step S5-3, the process waits for the communication check time. Upon reaching the communication check time (Yes in step S5-4), the process proceeds to step S5-1 to check whether communication is enabled.

On the other hand, in a case where communication with the management server 3 is disabled in step S5-1 (No in step S5-1), a management worker who manages the management server 3 is requested to restore communication (step S5-5).

(Discharge Detection Operation)

The discharge detection operation of the third embodiment shares many steps with the discharge detection operation of the first embodiment, and some steps are different from those in the communication check operation of the first embodiment. Therefore, the same steps as those in the discharge detection operation of the first embodiment are denoted by the same step numbers, and the description thereof will be omitted.

Similarly to the discharge detection operation of the first embodiment, the discharge detection operation of the third embodiment is repeatedly executed while the power generation facility 2 is running.

Figure 8:
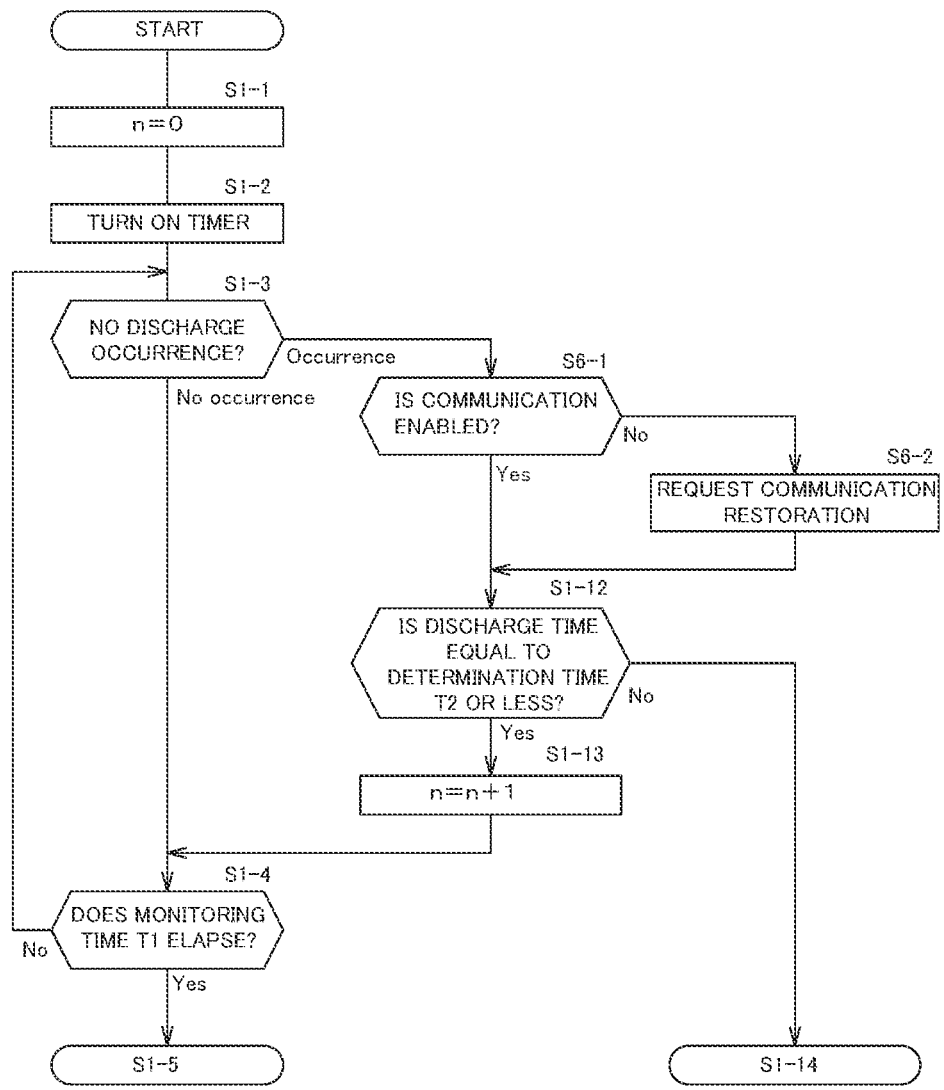
FIG. 8 is a flowchart of a discharge detection operation of the discharge handling system in FIG. 7.

In the discharge detection operation of the third embodiment, first, a counter n is reset (step S1-1), and a timer is turned on (step S1-2) as illustrated in FIG. 8. Then, the arc discharge detector 20 checks whether or not an arc discharge occurs between the solar cell module 10 and the power conversion device 12 (step S1-3).

In a case where the arc discharge occurs in step S1-3 (Occurrence in step S1-3), it is checked whether communication with the management server 3 is enabled by receiving data from the management server 3 or transmitting data to the management server 3 (step S6-1).

In a case where communication is enabled in step S6-1 (Yes in step S6-1), the process proceeds to step S1-12.

On the other hand, in a case where communication with the management server 3 is disabled in step S6-1 (No in step S6-1), the management worker who manages the management server 3 is requested to restore communication (step S6-2), and the process proceeds to step S1-12.

As for the discharge handling system of the present embodiment, the management server 3 dispersively determines the communication check times such that the communication does not overlap with communication between other power generation facilities 2 and the management server 3, and transmits the communication check time to each power generation facility 2, and each power generation facility 2 individually sets the communication check time. As a result, a communication failure due to excessive communication traffic is unlikely to occur.

With the discharge handling system of the present embodiment, it is possible to check a communication state with the management server 3 at the time point when the arc discharge occurs, or to perform a periodic communication check (for example, once a day). This makes it possible to promptly handle the occurrence of an arc discharge that may lead to a fire.

In the first embodiment described above, the comparison between the number of times n of the arc discharge in the monitoring time T1 and the number-of-times threshold m, and the comparison between the total discharge time of the arc discharge in the monitoring time T1 and the determination time T3 are executed in this order in the discharge detection operation. However, the present invention is not limited thereto. The comparison between the total discharge time of the arc discharge in the monitoring time T1 and the determination time T3, and the comparison between the number of times n of the arc discharge in the monitoring time T1 and the number-of-times threshold m may be executed in this order.

In the first embodiment described above, the comparison between the number of times n of the arc discharge in the monitoring time T1 and the number-of-times threshold m, the comparison between each discharge time of the arc discharge in the monitoring time T1 and the determination time T2, and the comparison between the total discharge time of the arc discharge in the monitoring time T1 and the determination time T3 are executed in this order in the maintenance determination operation. However, the present invention is not limited thereto. The order of these comparisons is not particularly limited.

In the second embodiment described above, after the presence or absence of the interruption of the series arc discharge by the series arc discharge interrupter or the forced stop of the power conversion device 12 by the power conversion controller 22 is checked, the presence or absence of the interruption of the parallel arc discharge by the parallel arc discharge interrupter is checked. However, the present invention is not limited thereto. After the presence or absence of the interruption of the parallel arc discharge by the parallel arc discharge interrupter is checked, the presence or absence of the interruption of the series arc discharge by the series arc discharge interrupter or the forced stop of the power conversion device 12 by the power conversion controller 22 may be checked.

In the first embodiment described above, the detection-side notification unit 26 does not directly notify the user of the occurrence of the arc discharge in a case where the arc discharge detector 20 detects the arc discharge, the number of times n of the arc discharge in the monitoring time T1 is the number-of-times threshold m or less, each discharge time of the arc discharge is equal to the determination time T2 or less, and the total discharge time of the arc discharge in the monitoring time T1 is equal to the determination time T3 or less. However, the present invention is not limited thereto. Even in such a case, the detection-side notification unit 26 may directly notify the user of the occurrence of the arc discharge.

Similarly, in the second embodiment described above, the detection-side notification unit 26 does not directly notify the user of the occurrence of the arc discharge in a case where the arc discharge detector 20 detects the arc discharge, the series arc discharge is not interrupted by the series arc discharge interrupter of the arc discharge interrupter 21, or the power conversion device 12 is not forcibly stopped by the power conversion controller 22, and further the parallel arc discharge is not interrupted by the parallel arc discharge interrupter of the arc discharge interrupter 21. However, the present invention is not limited thereto. Even in such a case, the detection-side notification unit 26 may directly notify the user of the occurrence of the arc discharge.

In the embodiments described above, the power generation facility 2 and the management server 3 are separately provided, but the present invention is not limited thereto. The power generation facility 2 and the management server 3 may be integrated.

In the embodiments described above, the determination unit 50 is provided in the management server 3, but the present invention is not limited thereto. The determination unit 50 may be provided in the power generation facility 2.

In the embodiments described above, the power generation facility 2 is a solar power generation facility including the solar cell module 10 as a power module, but the present invention is not limited thereto. The power generation facility 2 may be another power generation facility such as a fuel cell power generation facility including a fuel cell module as a power module. In this case, by replacing the solar cell module 10 with the fuel cell module, it is possible to handle the occurrence of an arc discharge between the fuel cell module and the power conversion device 12. Similarly, the power generation facility 2 may be a storage battery system including a storage battery module as a power module. In this case, by replacing the solar cell module 10 with the storage battery module, it is possible to handle the occurrence of an arc discharge between the storage battery module and the power conversion device 12.

In the third embodiment described above, it is checked whether the power generation facility 2 can communicate with the management server 3 in the communication check operation, but the present invention is not limited thereto. In the communication check operation, whether the management server 3 can communicate with the power generation facility 2 may be checked. In this case, it is preferable that the management server 3 determines the communication check times such that the communication does not overlap with communication between other power generation facilities 2 and the management server 3, and upon reaching the communication check time of each power generation facility 2, it is checked whether communication is enabled by transmitting data to the corresponding power generation facility 2 or receiving data from the power generation facility 2.

As an application example of the above embodiments, an interval between occurrence times of the arc discharge detected by the arc discharge detector 20 in the monitoring time T1 may also be added to determination criteria of the maintenance period. That is, there is a tendency that the fire occurrence risk increases as the interval between the occurrence times of the arc discharge decreases, thereby a maintenance timing having to be shortened. To the contrary, there is a tendency that the fire occurrence risk decreases as the interval between the occurrence times of the arc discharge increases, thereby a maintenance timing being able to be lengthened.

In the embodiments described above, each component member can be freely replaced or added between the embodiments as long as it is included in the technical scope of the present invention.

EXPLANATION OF REFERENCE SIGNS

1: Discharge handling system
3: Management server
5: Worker terminal
6: Network
10: Solar cell module (power module)
11: Arc discharge detection device
12: Power conversion device
20: Arc discharge detector
25: Communication state check unit
26: Detection-side notification unit (arc discharge notification unit)
50: Determination unit

What is claimed is:

1. A discharge handling system comprising: a power module; a power conversion device; and an arc discharge detection device,
   the arc discharge detection device including an arc discharge detector configured to detect occurrence of an arc discharge between the power module and the power conversion device,
   the arc discharge detection device measures the number of times of the arc discharge detected by the arc discharge detector and measures discharge time of the arc discharge every time a monitoring time elapses,
   the discharge handling system comprising a determination unit configured to determine necessity of maintenance within a predetermined period on condition that any of conditions (1) to (3) below is satisfied:
   (1) the number of times of the arc discharge in the monitoring time is from 1 to a number-of-times threshold inclusive;
   (2) each of the discharge time of the arc discharge in the monitoring time is equal to first determination time or less; and
   (3) total of the discharge time of the arc discharge in the monitoring time is equal to second determination time or less.

2. The discharge handling system according to claim 1, wherein the power module is a solar cell module, a fuel cell module, or a power storage module.

3. The discharge handling system according to claim 1, wherein the determination unit determines necessity of maintenance within the predetermined period on condition that all the conditions (1) to (3) are satisfied.

4. The discharge handling system according to claim 1, wherein the determination unit determines necessity of maintenance within a period shorter than the predetermined period on condition that the number of times of the arc discharge in the monitoring time exceeds the number-of-times threshold.

5. The discharge handling system according to claim 1, wherein the determination unit determines necessity of maintenance within a period shorter than the predetermined period on condition that discharge time in the monitoring time exceeds the first determination time.

6. The discharge handling system according to claim 1, wherein the determination unit determines necessity of maintenance within a period shorter than the predetermined period on condition that total discharge time of the arc discharge in the monitoring time exceeds the second determination time.

7. The discharge handling system according to claim 1, comprising a plurality of power generation facilities each including the power module, the power conversion device, and the arc discharge detection device,
   wherein each of the power generation facilities is connected to a management server via a network, and
   wherein the determination unit is provided in the management server.

8. The discharge handling system according to claim 1, wherein the arc discharge detection device is connected to a management server via a network, the arc discharge detection device including a communication state check unit configured to transmit data to or receive data from the management server,
   wherein the arc discharge detection device executes a communication check operation on condition that the arc discharge detector detects the arc discharge, and
   wherein in the communication check operation, the communication state check unit transmits data to or receives data from the management server every time check time elapses.

9. The discharge handling system according to claim 1, wherein the arc discharge detection device includes an arc discharge notification unit configured to notify occurrence of the arc discharge, and
   wherein the arc discharge notification unit does not directly notify the occurrence of the arc discharge in a case where all the conditions (1) to (3) are satisfied.

10. The discharge handling system according to claim 1, comprising a worker terminal including a work-side notification unit configured to notify maintenance within the predetermined period in a case where the determination unit determines that maintenance within the predetermined period is necessary.

11. A discharge handling system comprising: a power module; a power conversion device; and an arc discharge detection device,
    the arc discharge detection device including:

an arc discharge detector configured to detect occurrence of an arc discharge between the power module and the power conversion device;

an arc discharge interrupter configured to interrupt the arc discharge between the power module and the power conversion device; and a power conversion controller configured to forcibly stop the power conversion device, the arc discharge detection device monitoring the number of times of the arc discharge detected by the arc discharge detector and discharge time of the arc discharge every time a monitoring time elapses, the arc discharge interrupter interrupting the arc discharge on condition that any of conditions (4) to (6) below is satisfied, and necessity of maintenance within a predetermined period being determined on condition that all of conditions (7) to (9) below are satisfied:

(4) the number of times of the arc discharge in the monitoring time exceeds a number-of-times threshold;

(5) each of the discharge time of the arc discharge in the monitoring time exceeds first determination time;

(6) total of the discharge time of the arc discharge in the monitoring time exceeds second determination time;

(7) the number of times of the arc discharge in the monitoring time is equal to 1 or more;

(8) the arc discharge between the power module and the power conversion device is not interrupted by the arc discharge interrupter; and (9) the power conversion device is not forcibly stopped by the power conversion controller.

* * * * *